United States Patent [19]

Nishiyama

[11] Patent Number: 5,477,552
[45] Date of Patent: Dec. 19, 1995

[54] APPARATUS AND METHOD FOR DATA CHECK IN STORAGE SYSTEM

[75] Inventor: Shinji Nishiyama, Kawasaki, Japan

[73] Assignee: Fujitsu Limited, Kawasaki, Japan

[21] Appl. No.: 987,680

[22] Filed: Dec. 9, 1992

[30] Foreign Application Priority Data

Dec. 13, 1991 [JP] Japan .................. 3-330340

[51] Int. Cl.⁶ .............................................. G06F 11/10
[52] U.S. Cl. .................................. 371/40.1; 371/40.4
[58] Field of Search ............................. 371/40.1, 40.4, 371/10.1, 25.1; 395/425

[56] References Cited

U.S. PATENT DOCUMENTS

| | | | |
|---|---|---|---|
| 3,944,975 | 3/1976 | Yasumoto et al. | 371/24 |
| 4,092,732 | 5/1978 | Ouchi | 235/312 |
| 4,775,978 | 10/1988 | Hartness | 371/38.1 |
| 4,817,035 | 3/1989 | Timsit | 371/38.1 |
| 4,849,927 | 7/1989 | Vos | 235/382 |
| 4,949,342 | 8/1990 | Shimbo et al. | 371/40.1 |
| 5,043,874 | 8/1991 | Gagliardo et al. | 395/425 |
| 5,185,746 | 2/1993 | Tanaka et al. | 371/40.1 |

FOREIGN PATENT DOCUMENTS

| | | |
|---|---|---|
| 0503417 | 9/1992 | European Pat. Off. . |
| 57-50307 | 3/1982 | Japan . |
| 61-278083 | 12/1986 | Japan . |
| 62-212577 | 9/1987 | Japan . |
| 63-74162 | 4/1988 | Japan . |
| 63-081660 | 4/1988 | Japan . |
| 63-149873 | 6/1988 | Japan . |
| 63-195878 | 8/1988 | Japan . |

*Primary Examiner*—Paul P. Gordon
*Attorney, Agent, or Firm*—Greer, Burns & Crain, Ltd.

[57] ABSTRACT

In an apparatus and method for data checking in a storage system such as a disk array system which includes a plurality of storage devices, the write data have error detecting codes for a host device thereof checked and stored in a register unit, the write data are divided, error detecting codes for storage devices are generated, and the write data are written in the storage devices are simultaneously transferred through paths used for the read data. The write data are combined into host data, error detecting codes for the host device are generated, and the generated codes are compared with the codes stored in the register unit so as to check whether they correspond to each other. Alternatively, the read data have error detecting codes for the storage devices thereof checked and stored in a register unit. In that case the read data are combined into host data to be transferred through the host device, the combined data is transferred through the paths used for the write data, the data are divided into storage device data, error detecting codes for storage devices are generated, and the generated codes are compared with the codes stored in the register unit so as to check whether they correspond to each other.

12 Claims, 11 Drawing Sheets

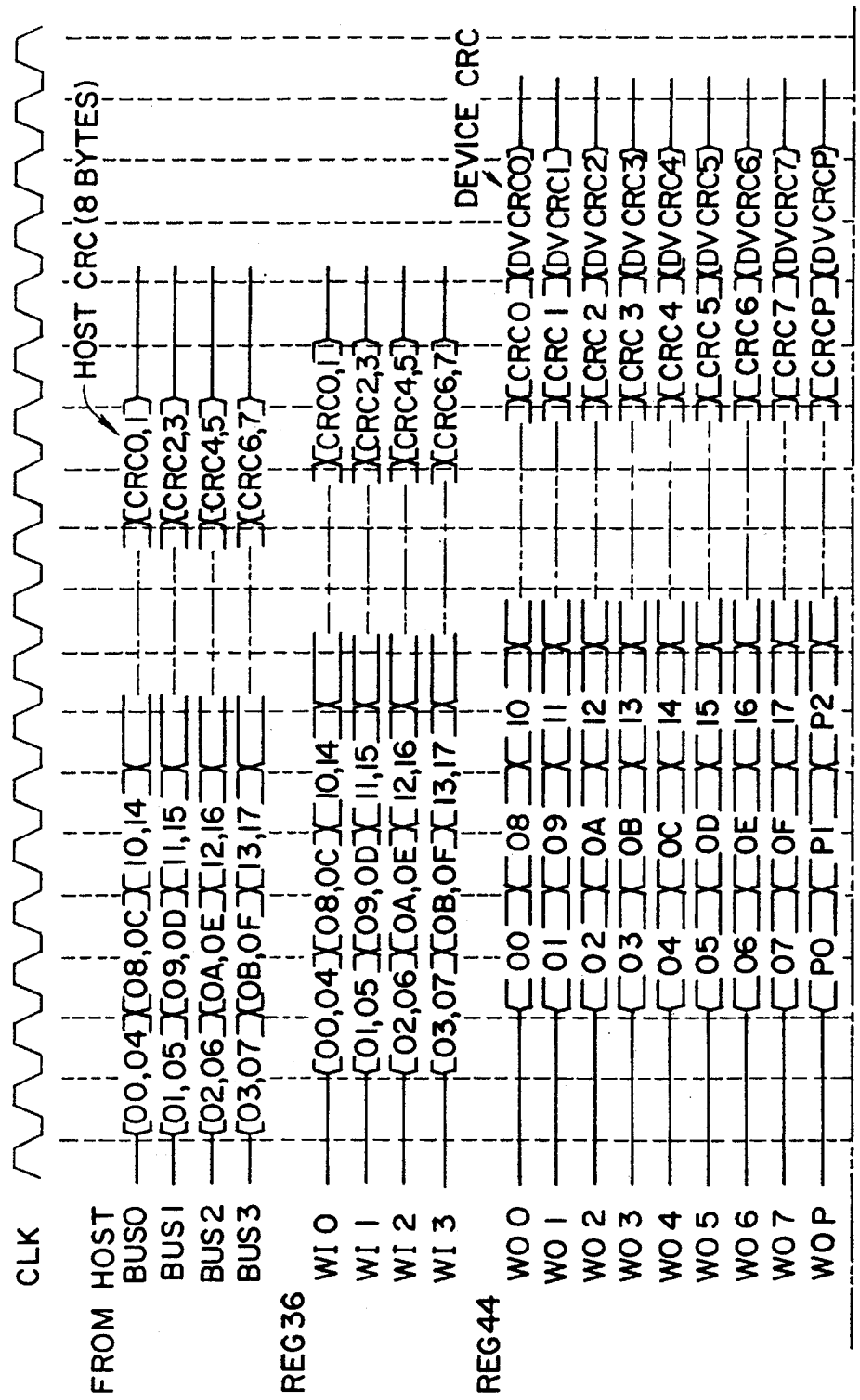

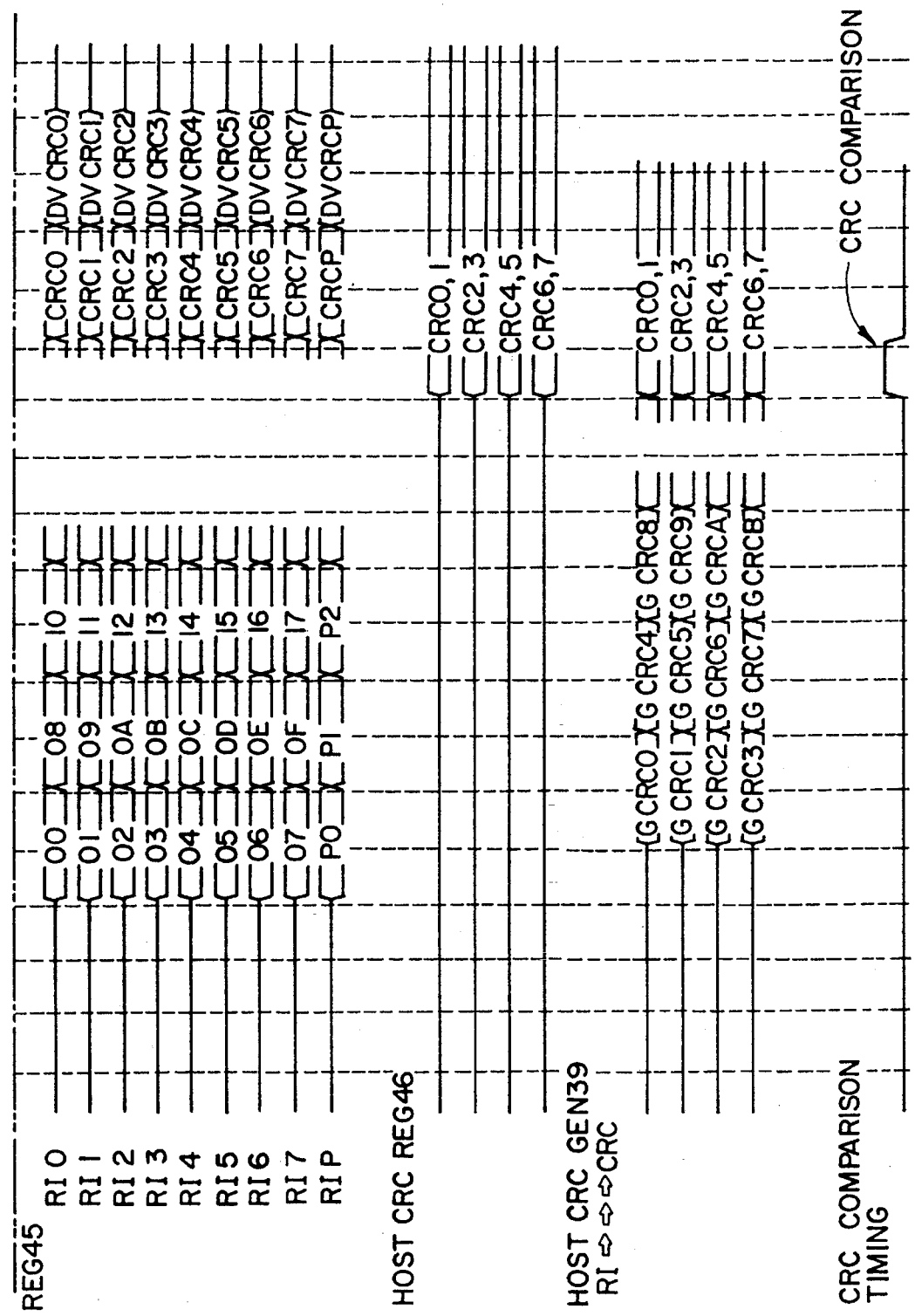

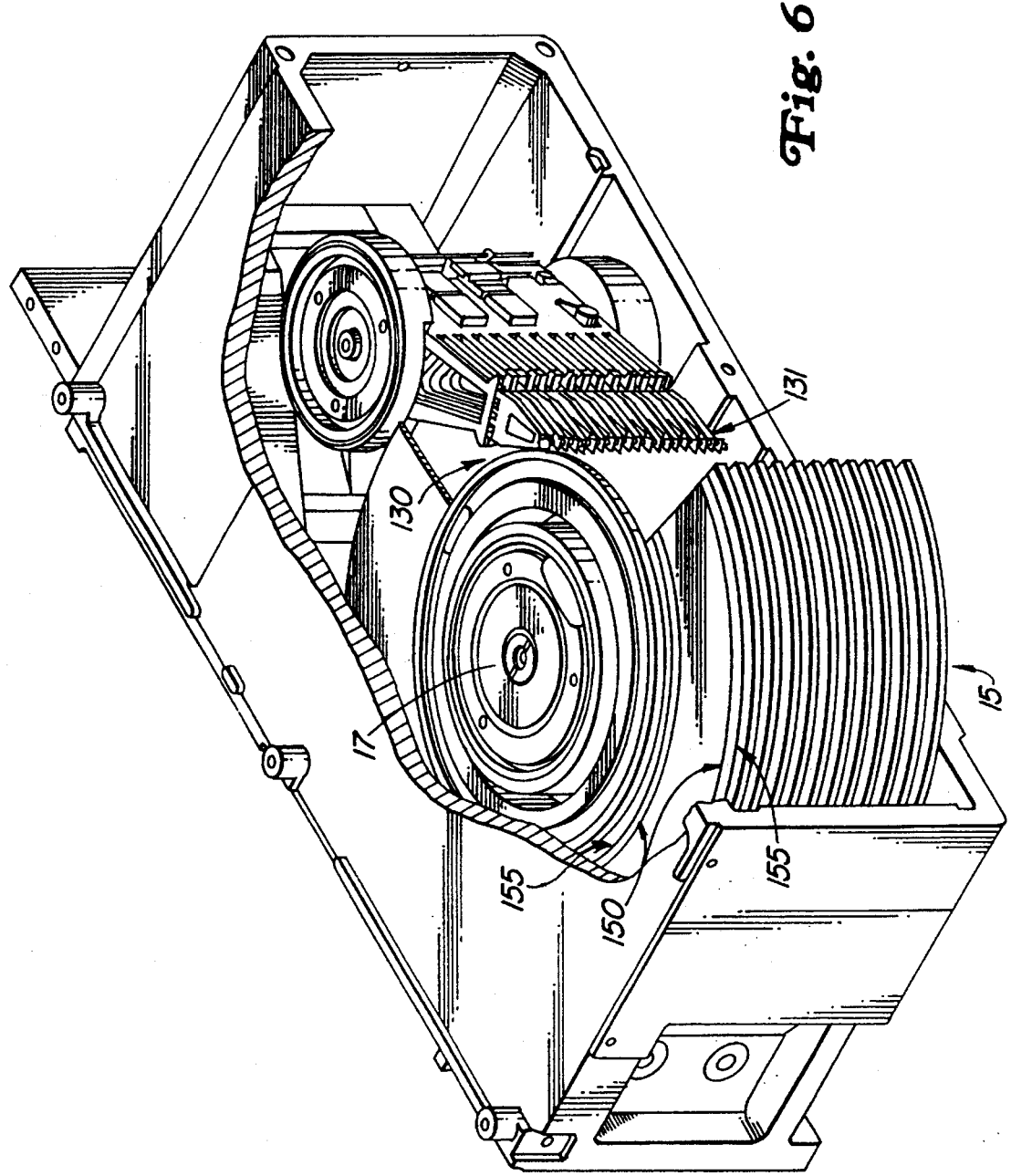

APPARATUS AND METHOD FOR DATA CHECK IN STORAGE SYSTEM

BACKGROUND OF THE INVENTION

1. Field of the Invention

The present invention relates to an apparatus and method for data check for a storage system, e.g., a disk array system which is provided with a plurality of magnetic disk drives and which operates these magnetic disk drives in parallel and which allows data to be simultaneously input to these magnetic disk drives and to be output therefrom.

There is recently a tendency to demand, in a computer system, a transfer of large amounts of data at high speed, and therefore, an auxiliary storage system is also required to transfer large amounts of data at high speed to exchange data with a host device.

To meet this requirement, the auxiliary storage system, e.g., magnetic disk array system, has been developed, which is mainly constituted from a plurality of storage devices such as several units of magnetic disk drives and which enables plural bytes of data to be transferred in parallel between the host device and the storage devices.

2. Description of the Related Art

Here, the conventional magnetic disk array system, which is representative of the storage system, will be explained more specifically.

In general, in a single unit of a magnetic disk drive, data transfer speed is limited by a rotation speed of a motor which rotates a magnetic disk as a recording medium. Accordingly, if it is intended to attain high speed operation by increasing a data transfer speed, it is necessary to perform write/read operations in parallel by driving a plurality of disk drives simultaneously. At this time, according to a command from a host device, the spindle motors of the magnetic disk drives connected in parallel with the host device are synchronously rotated, so that it becomes possible to perform a parallel transfer of data. Such a construction is called a disk array system, or a disk array device.

Further, in addition to the data transfer at high speed, fault tolerance of the whole system is also required for such a disk array system so that sufficient reliability for the large amounts of data can be ensured without decreasing the data transfer speed.

To attain such a fault tolerant system, even though a failure, such as the inability to read data from one disk drive of a plurality of disk drives, has occurred, it is necessary for the disk array system to be constructed so that the data of the failed disk drive can be reconstructed immediately without stopping operation of the whole disk array system.

Some kinds of disk array systems in practical use, in which the above-mentioned data transfer at high speed and the fault tolerance can be satisfied simultaneously, have begun to be announced by various computer manufacturers as the products of disk array system called RAID (Redundant Arrays of Inexpensive Disks) 1 to RAID 5.

Among these RAIDs 1–5, RAID 3, which is especially adequate for the case where large amounts of data have to be processed continuously at high speed, e.g., scientific calculations, will be described in more detail.

In the RAID 3, the disk array system typically includes a plurality of disk drives for data transfer (for example, eight (8) disk drives) and a disk drive for parity checking, all these disk drives operating in parallel simultaneously. In this case, some given parity data corresponding to the parallel data of the respective disk drives for data transfer are previously stored in the disk drive for parity checking (parity disk drive). In such a construction, even though one disk drive of a plurality of disk drives fails so that the data cannot be read out, the data can be reconstructed by reading the parity data from the parity disk drive.

Further, in the RAID 3, a spare storage disk drive is also provided. All the data in the failed disk drive is automatically reconstructed and transferred into the spare storage disk drive. If the reconstruction process is completed, the spare storage device can be utilized as a normal disk drive, in cooperation with the other disk drives for data transfer.

In this manner, the disk array system as represented by the RAID 3, which enables large amounts of data to be transferred at relatively high speed (for example, 36 M Bytes/sec) and has substantially fault tolerant characteristics, can be prepared.

Further, when such large amounts of data are actually transferred into a plurality of disk drives in parallel and are written therein simultaneously, it is necessary to examine whether or not all the written data are correct, so that the reliability of the above-mentioned large amounts of written data can be ensured as highly as that of small amounts of data.

In this case, it is desirable that some measures for confirming the write data in a simple manner and in a relatively short time should be taken, in order to maintain the data reliability without remarkably decreasing data transfer speed.

As a typical one of these measures, a method of adding an error detecting code such as CRC (cyclic redundancy check) data, for each data block of a certain byte length, is in practical use.

Hereinafter, a conventional apparatus and method for data checking executed by adding CRC data will be described with reference to FIGS. 1 to 3, so that a process of data checking for a disk array system will be understood more clearly.

FIGS. 1 to 3 are block diagrams for explaining a process of data checking according to a prior art. To be more specific, FIG. 1 is a block diagram of a disk array system, FIG. 2 is a block diagram for explaining a CRC adding process, and FIG. 3 is a block diagram of a data path control circuit.

In these figures, 31 denotes a host computer (HOST), 32 a disk array system, 33 a disk controller, 34 storage devices (e.g., magnetic disk drives), and 35 a data path control circuit. Especially, in FIG. 3, 36, 37, 44 and 45 denote register units, respectively, and 38 denotes a host CRC checker, 39 a host CRC generator, 40 a write data converter, 41 a device CRC generator, 42 a read data converter, and 43 a device CRC checker.

A currently used disk array system is constructed, for example, as shown in FIG. 3. As illustrated in FIG. 3, the disk array system 32 is provided with a disk controller 33 and a plurality of storage devices 34, e.g., a plurality of magnetic disk drives.

This disk array system 32 is connected to a host device, e.g., a host computer (HOST) 31 and is used as a subsystem (which is so-called DIA: Disk In Array) for the host computer 31.

Among the plurality of storage devices 34, typically, eight storage devices (DV0 to DV7) are used for storing normal data, one storage device (DVP) is used for storing parity data, and one storage device (DVS) is used as a spare storage device.

The disk array system 32 realizes data transfer at high speed by operating the plurality of storage devices 34 in parallel, and by inputting and outputting data to and from these storage devices 34 simultaneously.

The disk array system 32 also operates the parity storage device (DVP) in parallel independently of the storage devices (e.g., DV0 to DV7) for storing the data, thereby storing parity data in this storage device (DVP).

With this arrangement, even if one of the eight storage devices (DV0 to DV7) for storing the data becomes unable to read data, the data can be reconstructed from the parity storage device (DVP).

Further, when a failure has occurred in one of the eight storage devices (DV0 to DV7), the data stored in the failed storage device is transferred to the spare storage device (DVS), and thereafter the spare storage device can be used for normal operation.

In the disk array system 32, data blocks from the host computer 31 is divided and written in the plurality of storage devices 34. At this time, typically, CRC data is added as an error detecting code to each of the divided data blocks (normally data to be stored in one sector) including a specified number of bytes of data from the disk controller 33, and is written in each of the storage devices 34 together with the data, thereby securing the data.

The CRC data adding process is illustrated in FIG. 2. In this case, it is assumed that the data transmitted through four paths from the host computer 31 (hereinafter referred to as four path data) is converted by the data path control circuit 35 provided in the disk controller 33 so as to be transferred to the storage devices through eight paths (hereinafter referred to as eight path data).

In this way, the four path data are converted into the eight path data, which are written in the plurality of storage devices (DV0 to DV7). At this time, the CRC data are generated from each data transferred through the paths from the host computer 31.

For instance, in the case of a host CRCH0 (CRC data added in the host computer 31), it is generated from data DT0, DT4, DT8, DT12, DT16, DT20, etc.

Further, a host CRCH1 is generated from DT1, DT5, DT9, DT13, DT17, DT21, etc., and a host CRCH2 is generated from DT2, DT6, DT10, DT14, DT18, DT22, etc.

Device CRCs (CRC data added to the data to be read from the storage devices in the data path control circuit) are generated for each of the eight divided paths. For instance, a CRCD0 is generated from DT0, DT8, DT16, etc. Further, a CRCD1 is generated from DT1, DT9, DT17, etc., and a CRCD2 is generated from DT2, DT10, DT18, etc.

An exemplary data path control circuit 35 will be described with reference to FIG. 3.

As shown in FIG. 3, the data path control circuit 35 is provided with register units (REG) 36, 37, 44 and 45, a host CRC checker (HOST CRC CHK) 38, a host CRC generator (HOST CRC GEN) 39, a write data converter 40, a read data converter 42, and the like.

Further, the write data converter 40 includes a device CRC generator (DV CRC GEN) 41, and the read data converter 42 includes a device CRC checker (DV CRC CHK) 43.

The register unit 36 is used when the write data are input to the data path control circuit 35, and the register unit 36 includes registers WI0 to WI3 corresponding to the four paths. The register unit 37 is used when the read data are output from the data path control circuit 35, and the register unit 37 includes registers RO0 to RO3 corresponding to the four paths.

The register unit 44 is used when the write data are output from the write data converter 40, and the register unit 44 includes registers WO0 to WO7 for storing normal data, a parity register WOP for storing a parity data, and a spare register WOS.

The register unit 45 is used when the read data are input to the read data converter 45, and the register unit 45 includes registers RI0 to RI7 for storing the normal data, a parity register RIP for storing a parity data, and a spare register RIS.

During the transfer of the write data, the data transmitted to the four paths from the host computer 31 are temporarily stored in the register unit 36. Thereafter, the data are converted from four path data into eight path data by the write data converter 40 after the CRC data are checked by the host CRC checker 38.

As this time, the CRC data are added to the data for the respective paths by the device CRC generator 41, and the eight path data and the parity data are temporarily stored in the register unit 44. Thereafter, the data are transferred to the respective storage devices 34 and are stored on the recording media (magnetic disks).

Further, during the transfer of the read data, the eight path data and the parity data read from the respective storage devices are temporarily stored in the register unit 45. Thereafter, these data are read into the read data converter 42, in which each CRC data is checked for each path by the device CRC checker 43, and the eight path data are converted into the four path data.

Thereafter, each CRC data is added to each of the four path data, which are transferred to the host computer after they are stored temporarily in the register unit 37.

In regard to the process of data check according to a prior art described above, there are the following problems.

(1) The data path control circuit 35 is provided with a large number of multiplexers, and therefore it is necessary for a complicated switching control of the multiplexers to be executed to switch paths for data conversion. At this time, the data may be erroneously transferred due to a failure of switching operations of some multiplexers.

(2) For instance, the write data converter 40 and the read data converter 42 actually include a large number of multiplexers for executing such a switching control at high speed. Accordingly, if these devices fail during switching operations, a data error may occur.

In this case, for example, even if the paths #0 and #1 at the device side are erroneously changed with each other due to a failure of the switching operations, such a data error cannot be detected even when the CRC check is applied. Further, even if the same data as in the path #0 is output to the path #1 due to undesired switching operations, the error cannot be detected by the CRC check.

(3) In such a process of CRC checking, since the CRC data is added and checked for the data of each path separately, the above-mentioned data error, which may occur when the paths are erroneously changed with each other, cannot be detected.

When these situations have occurred, erroneous data are transferred to the respective devices 34. Further, a user cannot notice that the data are erroneous, until the data are read from the devices 34 later and the CRC data check is executed for the read data. Consequently, the reliability of the data is deteriorated.

SUMMARY OF THE INVENTION

Accordingly, an object of the present invention is to provide an apparatus and method for data checking in a storage system, which enable high reliability of data in write/read operation to be ensured without disturbing data transfer at high speed.

A further object of the present invention is to provide an apparatus and method for data checking in a storage system, e.g., disk array system, which enable a data error, that may occur due to a failure of switching operations of data paths when large amounts of write data or read data are transferred to or from a plurality of storage devices, to be detected.

A still further object of the present invention is to provide an apparatus for data checking in a storage system, which enables such a data error to be detected by merely adding a simple circuit, thereby preventing the reliability of data from being deteriorated.

A still further object of the present invention is to provide a method for data checking in a storage system, which enables the data error to be detected by a simple process without increasing the time required for the data check.

A still further object of the present invention is to provide an apparatus and method for data checking, which is applicable to a disk array system that can process large amounts of data at high speed.

To attain the above objects, the apparatus for data checking according to the present invention, in a storage system which includes a plurality of storage devices, and which operates the respective storage devices in parallel, and which simultaneously transfers write data or read data to or from the respective storage devices in write/read operations, is operative to execute the write data checking process which is equivalent to the read data checking process, that will be executed in the read operation, when the write data are transferred to the respective storage devices in the write operation.

Preferably, the apparatus for data checkings, having first data transfer paths for transferring the write data and second data transfer paths for transferring the read data, is operative to execute the write data checking process by utilizing the second data paths, which are out of use during the write operation, as well as the first data transfer paths.

Further, preferably, in receiving the write data as data blocks each including data of an error detecting code generated in a host device, the apparatus comprises: means for checking and storing the data of error detecting codes for the host device; means for dividing the data blocks so as to be written in the plurality of storage devices simultaneously; means for generating data of an error detecting code for each of the storage devices for each of the divided data blocks, so that the divided data blocks, to which the respectively corresponding generated data of the error detecting codes are added, can be written in the respective storage devices and can be simultaneously transferred to the second data transfer paths; means for combining the data transferred to the second data transfer paths into data which are to be transferred to the host device; means for generating data of an error detecting code again for the host device for each of the combined data; and means for comparing each of the data of error detecting codes generated again for the host device, with the data of each of the error detecting codes stored previously, so as to check whether or not the two kinds of data correspond to each other and to check whether or not the write data have been correctly written in the respective storage devices.

More concretely, the means for storing the data of the error detecting codes includes a register unit for a host CRC check, and the means for comparing the two kinds of data with each other includes a comparator.

Further, preferably, the apparatus for data checking is also operative to execute the read data checking process by utilizing the first data transfer paths, which are out of use during the read operation, as well as the second data transfer paths.

Further, preferably, in receiving the read data as data blocks each including data of error detecting codes read from the respective storage devices, the apparatus comprises: means for checking and storing the data of error detecting codes for the respective storage devices; means for combining the data blocks into data which are to be transferred to a host device; means for generating data of an error detecting code for the host device for each of the combined data blocks, so that the combined data blocks can be transferred to the host device and to the first data transfer paths; means for generating data of an error detecting code again for each of the storage devices for each of the divided data; and means for comparing the data of each of the error correcting codes generated again for each of the storage devices, with the data of each of the error detecting codes stored previously, so as to check whether or not the two kinds of data correspond to each other.

More concretely, the means for storing the data of the error detecting codes includes a register unit for a device CRC check.

Further, in the method for data checking according to the present invention, the write data checking process, which is equivalent to the read data checking process, that will be executed in the read operation, is executed when the write data are transferred to the respective storage devices in the write operation, preferably by utilizing the second data transfer paths, which are out of use during the write operation, as well as the first data paths.

Alternatively, in the method for data checking, the read data checking process is executed by utilizing the first data transfer paths, which are out of use during the read operation, as well as the second data transfer paths.

In some preferred embodiments, the apparatus and method for data checking according to the present invention is applied to a disk array system.

According to the above-mentioned apparatus and method for data checking, the write data checking process can be executed as accurately as the read data checking process. Therefore, even if a data error occurs due to the undesired switching operations of the data paths during the transfer of the write data, such a data error can be immediately detected.

Further, the write data and read data are not simultaneously transferred. In view of this, the write data can be checked by effectively utilizing the paths for the read data, whereas the read data can be checked by effectively utilizing the paths for the write data. Thus, the transfer data can be checked merely by adding a simple construction such as the register unit and comparator.

BRIEF DESCRIPTION OF THE DRAWINGS

The above objects and features of the present invention will be more apparent from the following description of the preferred embodiments with reference to the accompanying drawings, wherein:

FIGS. 5(A) and 5(B) (FIG. 5) are timing charts for explaining the write data checking process in the data path control circuit shown in FIG. 4;

FIG. 6 is a perspective view, partially cut away, showing a mechanism of a magnetic disk drive;

DESCRIPTION OF THE PREFERRED EMBODIMENTS

The embodiments of the present invention will be described next with reference to the related figures.

Figure 1:
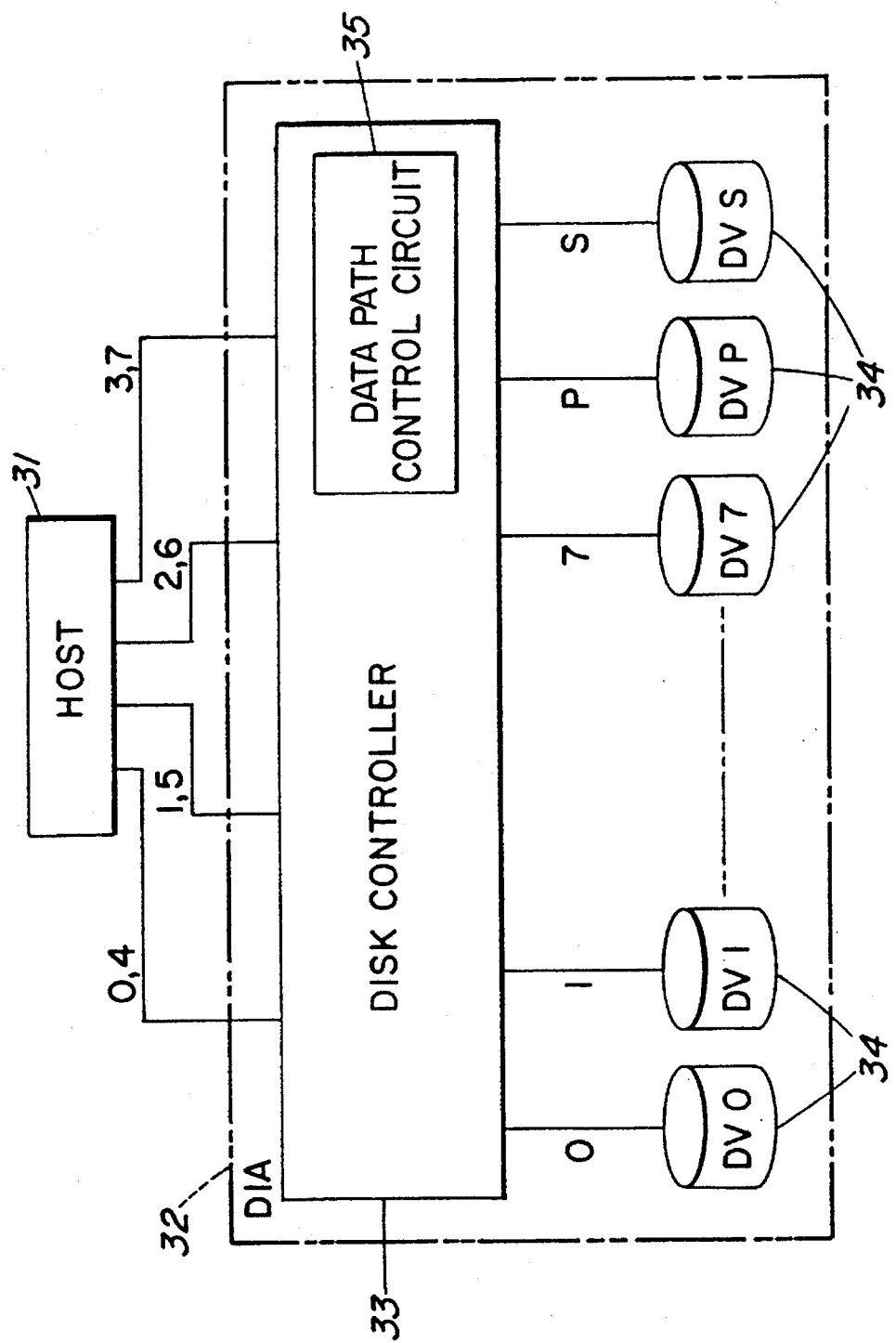
FIG. 1 is a block diagram of a conventional disk array system.
Figure 2:
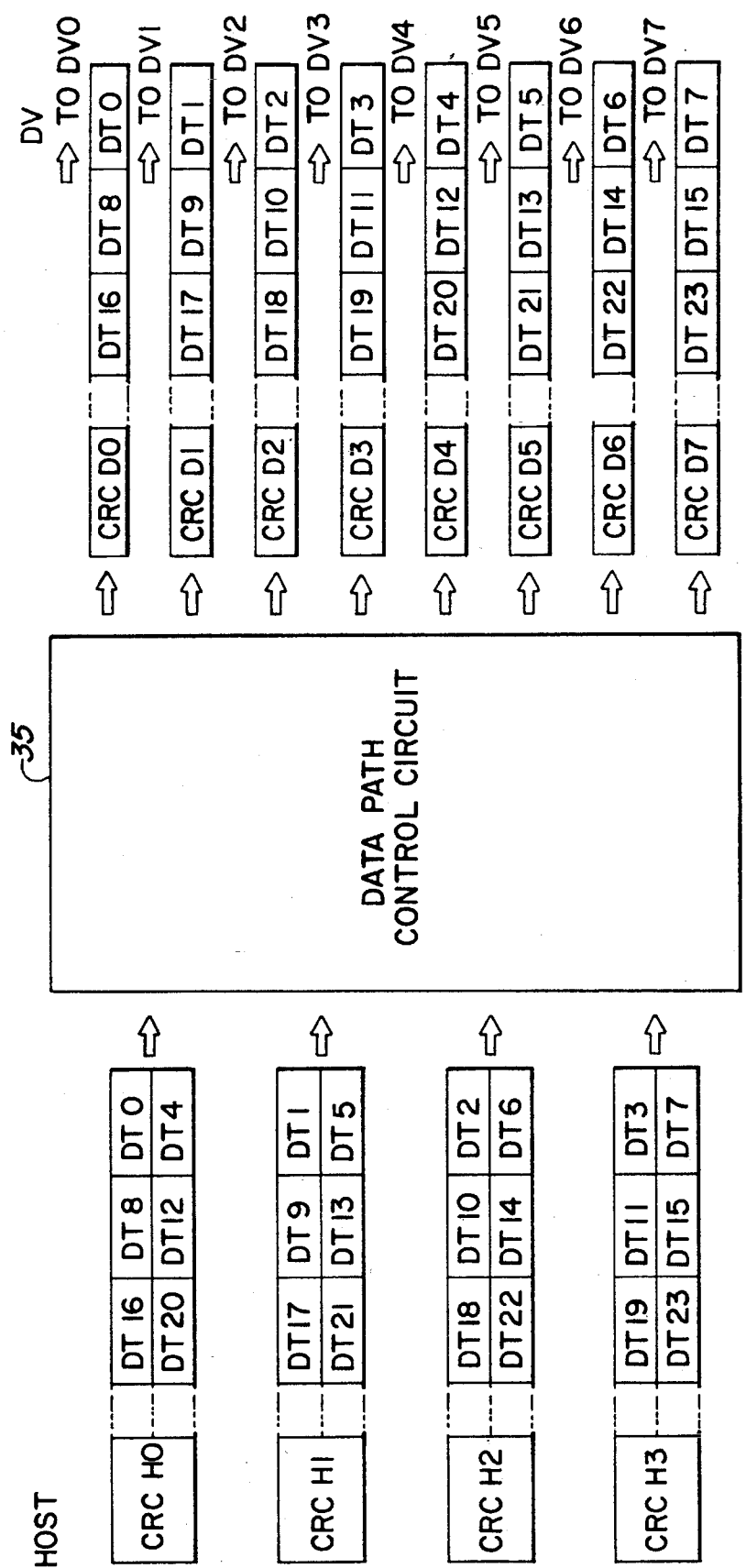
FIG. 2 is a block diagram for explaining a CRC adding process according to a prior art.
Figure 3:
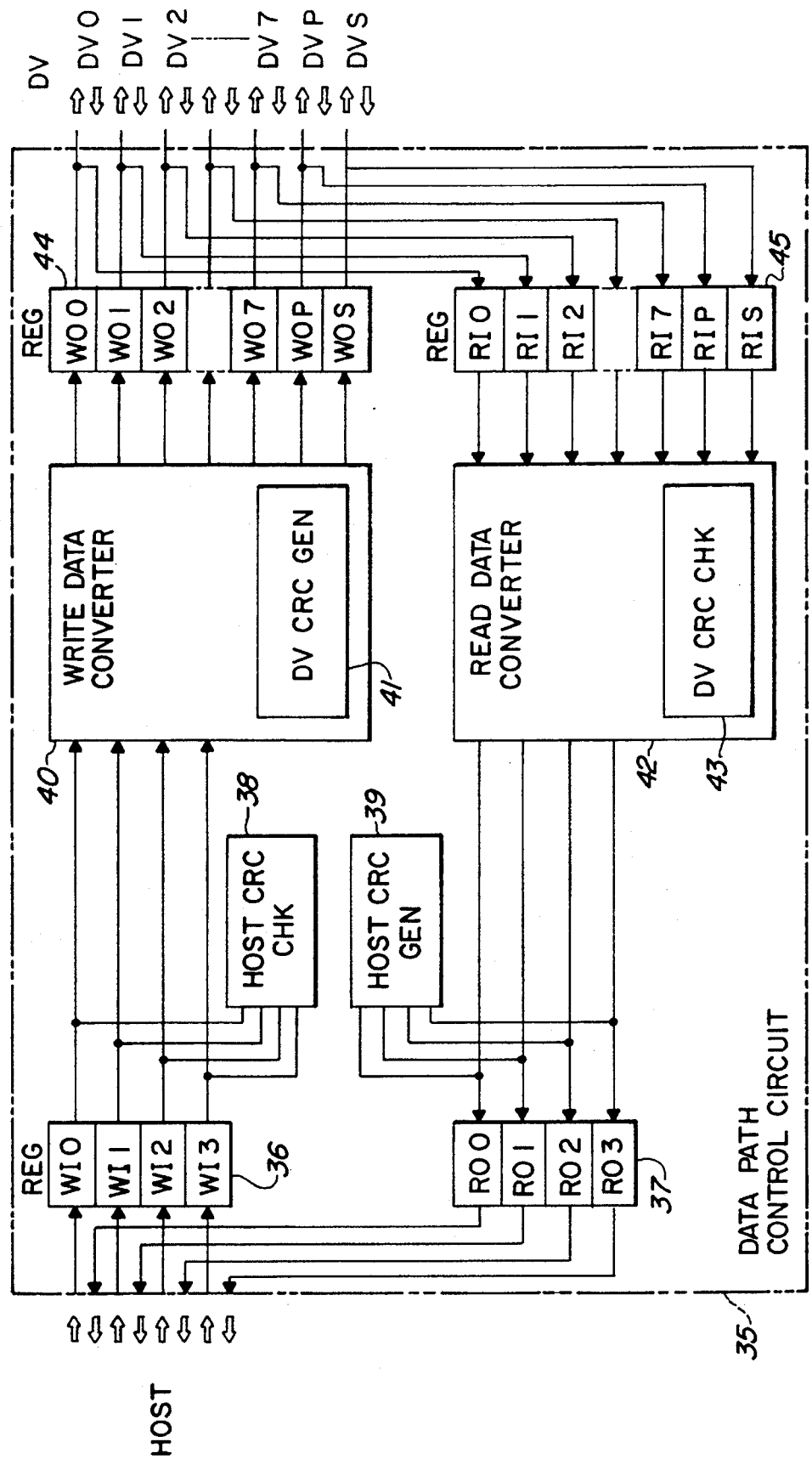
FIG. 3 is a block diagram of data path control circuit according to a prior art.
Figure 4:
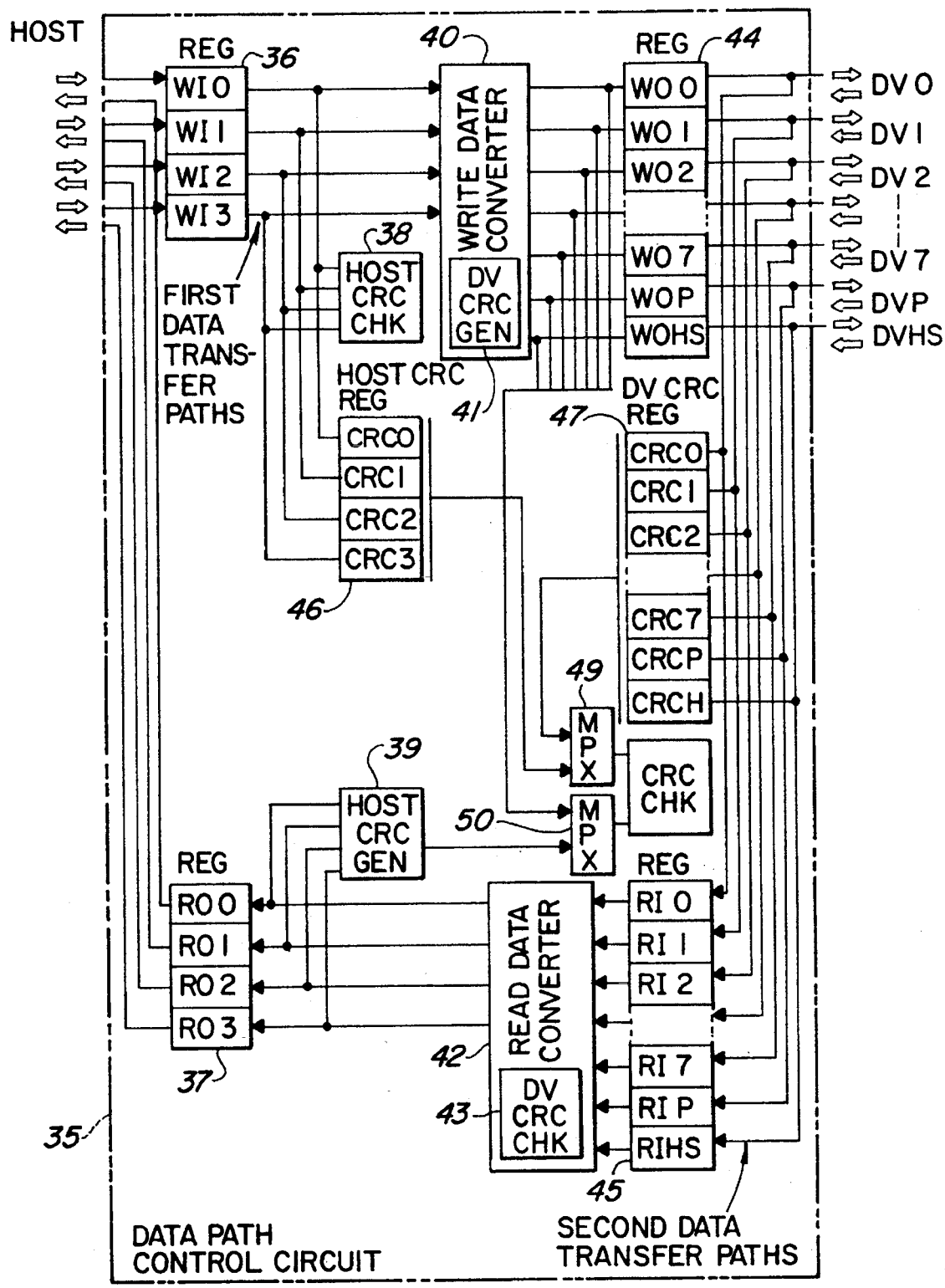
FIG. 4 is a block diagram of a data path control circuit showing an embodiment of the present invention.

FIG. 4 is a block diagram of a data path control circuit showing an embodiment of the present invention, in which the same elements as in FIGS. 1 to 3 are indicated with the same reference numerals. In this case, it should be understood that the circuit shown in FIG. 4 is a circuit provided in the disk controller 33 in FIG. 1.

The data path control circuit in this embodiment is provided with a register unit 46 for a host CRC check (hereinafter referred to as a host CRC register unit 46), a register unit 47 for a device CRC check (hereafter referred to as a device CRC register unit 47), a CRC checker (comparator) 48, and multiplexers 49, 50 in addition to the construction of the data path control circuit of the prior art shown in FIG. 3.

The host CRC register unit 46 includes four registers CRC0, CRC1, CRC2 and CRC3 corresponding to four paths, each register being adapted to store the CRC data for the corresponding path, i.e., first data transfer path for the write data.

The device CRC register unit 47 includes registers CRC0, CRC1, CRC2, . . . , CRC7, CRCP, and CRCS for respective paths corresponding to storage device 34 (DV0 to DV7, DVP, and DVS), each register being adapted to store the CRC data for the corresponding path, i.e., second data transfer path for the read data.

The CRC checker 48 is adapted to receive and compare two CRC data and, for example, includes a comparator. The multiplexers 49, 45 are circuits for switching the two inputs.

Although a processor and the like are provided so as to control the respective components shown in FIG. 4, these devices are not illustrated in FIG. 4. Further, a detailed description is omitted for the components included in the same construction as the prior art.

Hereinafter, a data check process of this embodiment will be described. It will be appreciated that the number of data paths is the same as the prior art and that host CRC and device CRC represents CRC data.

First, a write data check processing, executed when the write data are transferred to the respective devices 34, will be explained in detail.

When the data path control circuit 35 which is provided in the disk controller 33 (FIG. 1) has received the write data from the host computer 31 (FIG. 1), the CRC check is carried out in the following sequence.

The host CRC added to the write data from the host computer is checked by the host CRC checker 38, and is stored in the host CRC register unit 46 at the same time. To be more concrete, the write data from the host computer 31 are transferred through the four paths, and are stored in the registers WI0 to WI3 of the register unit 36 temporarily. Then, the CRC data is checked for each path of data by the host CRC checker 38.

Thereafter, the checked CRC data for the respective paths of data are stored in the registers CRC0 to CRC3 of the host CRC register unit 46.

The write data stored in the register unit 36 are converted by the write data converter 40 into eight path data and parity data, to which the CRC data are added for each path by the device CRC generator 41, and are stored in the register unit 44.

Subsequently, the data stored in the register unit 44 are transferred to the respective storage devices to be stored therein. At the same time, the eight path data and the parity data are transferred through the second data transfer paths used for reading the data to the register unit 45 and are stored therein.

The data stored in the register unit 45 have the CRC data thereof checked by the device CRC checker 43 in the read data converter 42, and are then converted into four path data.

The converted four path data have the CRC data which are added thereto for each path by the host CRC generator 39. At this time, the CRC data added by means of the host CRC generator 39 are input to the CRC checker 48 through the multiplexer 50, while CRC data stored in the host CRC register 46 are input to the CRC checker 48 through the multiplexer 49. The two kinds of CRC data, which are input to the CRC checker 48, are compared with each other in the CRC checker 48.

If the comparison result shows that these two kinds of CRC data correspond to each other, it is determined that there is no error and accordingly no data error has occurred during the transfer of write data. However, if a data error has occurred due to a failure in the write data converter 40 or in the read data converter 42, the above two kinds of data are different from each other. Consequently, the data error is easily and accurately detected by executing such a comparison.

Second, a read data process, executed when the read data are transferred to the host computer 31, will be explained in detail.

When the data path control circuit 35 has received the read data from the respective storage devices 34, the CRC check is carried out in the following sequence.

The device CRC data added to the read data from the respective storage devices are checked in the device CRC checker 43, and are stored in the host CRC register unit 47 at the same time. To be more concrete, the read data from the storage devices 34 are transferred through the eight paths for the normal data and the one path for the parity data, and are stored in the registers RI0 to RIS of the register unit 45 temporarily. Thereafter, the CRC data for the respective paths of read data are checked by the device CRC checker 43, and are stored in the registers CRC0 to CRCS of the device CRC register unit 47 (stored for each path).

Subsequently, the data for the respective paths after the CRC check are combined and converted by the read data converter 42 into four path data, to which the CRC data are added by the host CRC generator 39, and are stored in the register unit 37.

The combined data stored in the register unit 37 are transferred to the host computer for each path of data, but are simultaneously transferred to the register unit 36. After the respective CRC data stored in the register unit 36 are checked by the host CRC checker 38, the four path data are transferred through the first data transfer paths to the write data converter 40. Further, the four path data are divided and converted by the write data converter 40 into eight path data and parity data, to which the CRC data are added by the device CRC generator 41.

The respective CRC data added to the eight path data and the parity data in the device CRC generator 41 are input to the CRC checker 48 through the multiplexer 50, while the CRC data for the respective paths stored in the device CRC register 47 are input to the CRC checker 48 through the multiplexer 49. The two kinds of CRC data, which are separately input to the CRC checker 48, are compared with each other in the CRC checker 48 (comparison of the CRC data for each path).

If the comparison result shows that these data correspond to each other, it is determined that there is no error and accordingly no data error has occurred during the transfer of read data. However, if a data error has occurred due to a failure in the read data converter 42, the above two kinds of data are different from each other. Consequently, the data error is also easily and accurately detected by executing such a comparison.

Besides the CRC data described in the foregoing embodiment, the present invention is applicable to various other error detecting codes.

Further, data flow of the write data will be illustrated in FIGS. 5(A) and 5(B) by using timing charts, to clarify the data checking process.

FIGS. 5(A) and 5(B) are time charts for explaining the write data checking process in the data path control circuit shown in FIG. 4.

In FIG. 5(A), CLK denotes a clock signal which is a reference for synchronously rotating a plurality of storage device, e.g., a plurality of disk drives, in a disk array system.

In the condition that the system is synchronous with the clock signal CLK, first the write data of four data channels (BUS to BUS), to which the respective host CRC data of eight bytes are added, are transferred from the host computer 31 through the first data transfer paths, and are stored in the register unit 36 temporarily (WI0 to WI3).

Next, the write data are divided and converted by the write data converter 40 into eight path data and parity data, and are stored in the register unit 44 (WO0 to WOP). At this time, the device CRC data are added to these eight path data and the parity data.

Further, as shown in FIG. 5(B), the eight path data are transferred to the respective storage devices 34, and are simultaneously transferred through the second data transfer path to the register unit 45 to be stored therein (RI0 to RIP).

Further, the respective CRC data of the data stored in the register unit 45 are checked by the device CRC checker 43 in the read data converter 42. Thereafter, the eight path data are combined and converted again into four path data.

Further, the CRC data are generated again by the host CRC generator 39 for each four path data (RI→CRC).

Finally, the CRC data, which are added to each of the four path data by the host CRC generator, are compared with the CRC data stored previously in the host CRC register unit 46, in the CRC checker 48.

In this case, as apparent from FIGS. 5(A) and 5(B), the time required for completing the data checking process is relatively short, only as much as a length of time equivalent to several clock cycles. Therefore, the data checking process according to the present invention can be prevented from disturbing the data transfer at high speed.

As described above, the present invention has the following advantages.

(1) Even if a data error occurs due to a data path failure or the like, such an error can be detected during a data transfer. Accordingly, the reliability of the data can be improved.

(2) The data error can be reliably detected merely be adding a simple circuit. Accordingly, the reliability of a disk array system can be also improved while minimizing a cost increase due to the data checking process.

Here, in order to facilitate understanding of the embodiment according to the present invention, a perspective view, partially cut away, showing a mechanism of one magnetic disk drive is illustrated in FIGS. 6. As seen from this figure, a plurality of disks (e.g., eleven disks) 15 are rotated simultaneously by means of a spindle motor 17. The tracks on a recording surface of each disk 15 are written with a predetermined data pattern. However, the tracks at both ends of the inner zone and the outer zone of the disk 15 are formed as guard bands 150 in which a particular pattern is written, instead of a data pattern, the particular pattern being used for stopping a seek operation of two kinds of heads 130 and 131. Further, at the inner and the outer sides of the guard band 150, an erase zone 155 is formed for mechanically stopping the heads 130 and 131.

Figure 7:
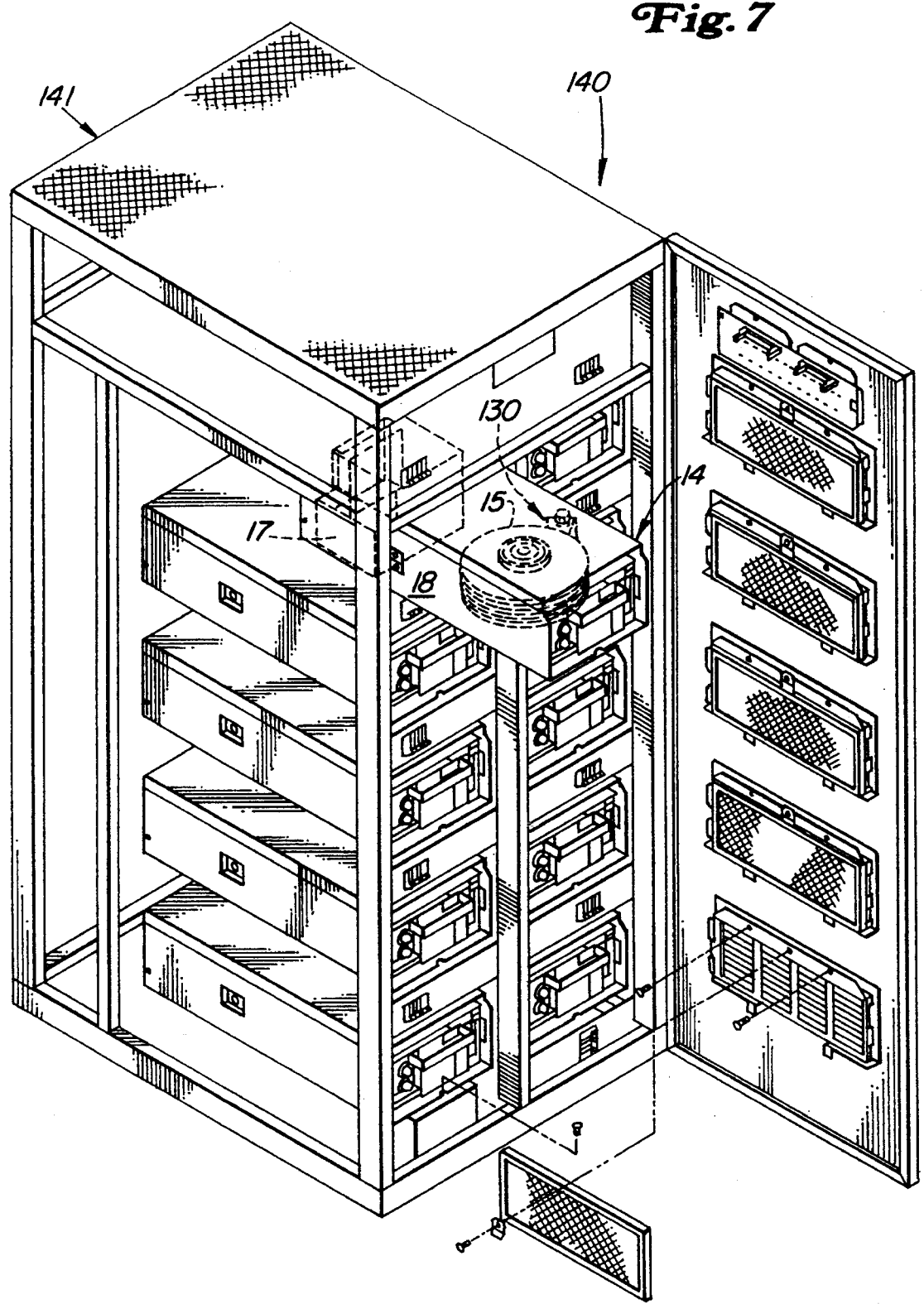
FIG. 7 is a perspective view showing the whole magnetic disk array system.

Preferably, the present invention is adopted to a disk array system 140 as shown in FIG. 7, wherein reference numeral 14 denotes a magnetic disk drive that includes the disks 15, and 141 denotes a housing that can accommodate a plurality of magnetic disk drives. In this case, the disk array system 140, i.e., disk array device is composed of eight disk drives for data transfer, one parity disk drive and one spare storage disk drive.

The magnetic disk drives 14 constituting each unit of disk array devices comprise a disk enclosure 18. The disk enclosure 18 serves to contain the disks 15 and the peripheral circuit module 17 inside the disk enclosure 18 per sec.

Each magnetic disk drive 14 is constructed to be easily inserted into the housing 141 and also easily removed therefrom, so that a maintenance operation can be rapidly performed when a failure, etc., has occurred.

Figure 8:
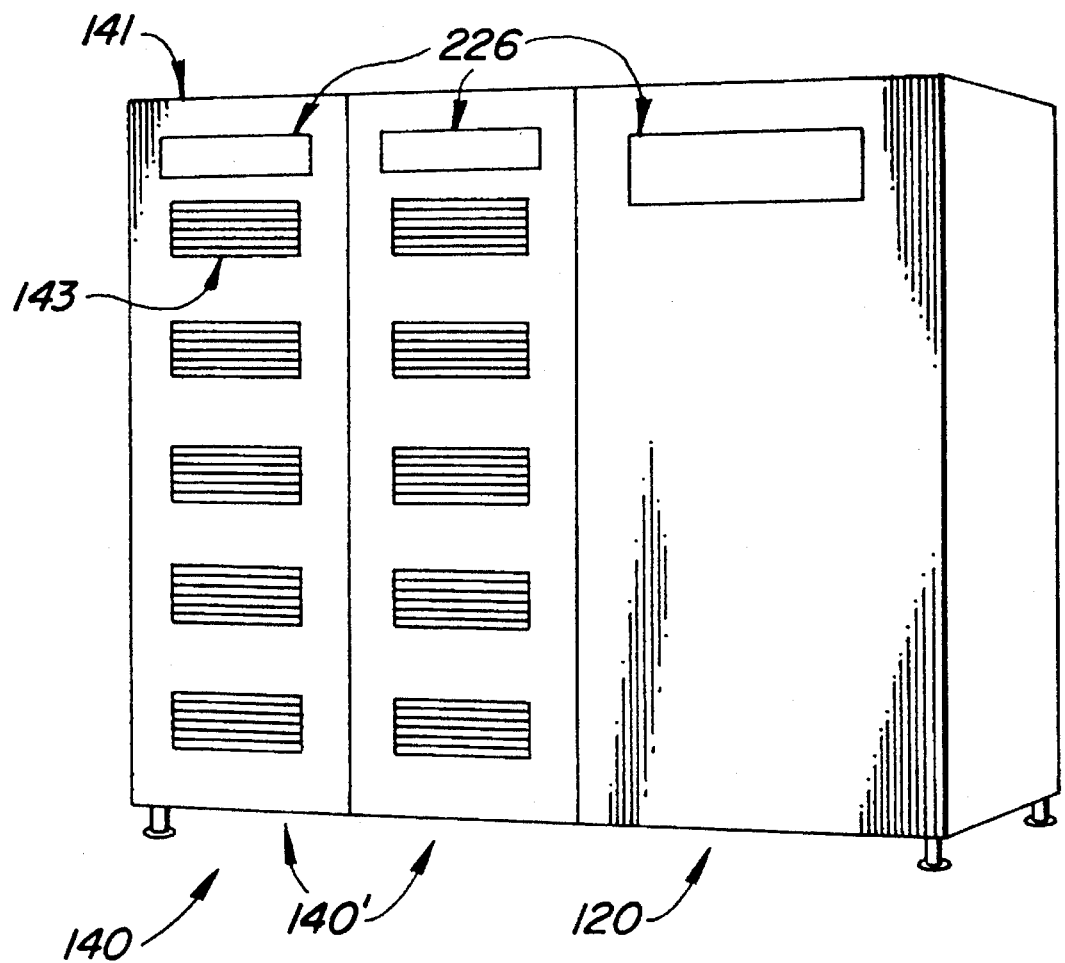
FIG. 8 is a perspective view showing an appearance of a plurality of disk array devices to which the present invention is applied.

Further, in order to clarify the whole construction of a disk array system to which the present invention is applied, an appearance of a plurality of disk array devices including the operation panel 226 is illustrated in FIG. 8.

In FIG. 8, a disk array system 140 is constituted by a plurality of disk array devices, e.g., two disk array devices 140' and a disk array control unit 120 for controlling these disk array devices 140'. The two disk array devices 140' and the disk controller is arranged to be contained in a housing 141. In this case, the front side of the housing 141 at each disk array device 140' is provided with the operation panel 226, in addition to a plurality of ventilation windows 143 for radiating heat generated from a plurality of disk drives (not shown in FIG. 8). Further, the front side of the housing 141 at the disk array control unit 120 is also provided with the operation panel 226.

Figure 9:
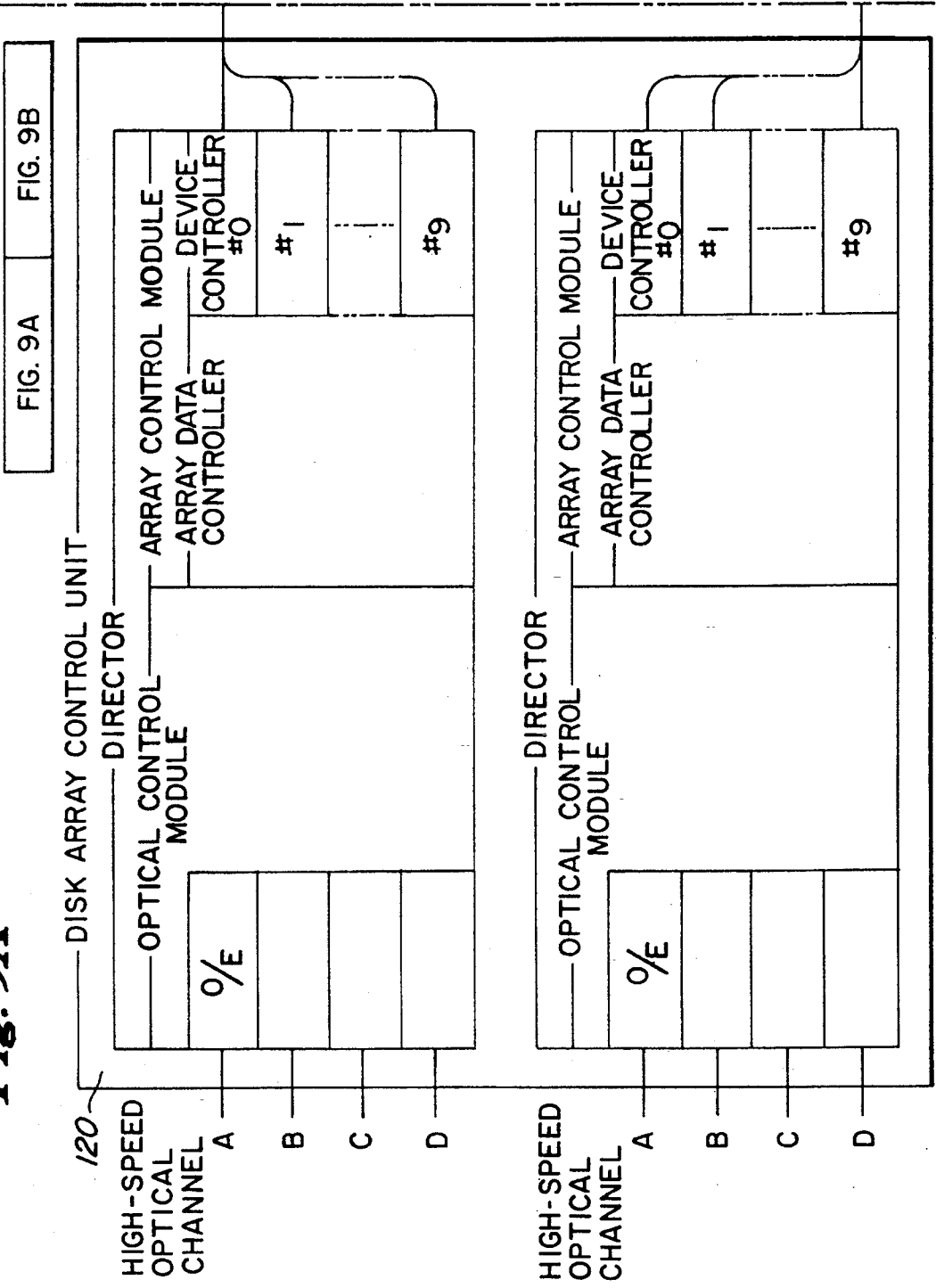
FIGS. 9(A) and 9(B) (FIG. 9) are block diagrams of a magnetic disk array control unit and the overall disk array devices, respectively.
Figure 9B:
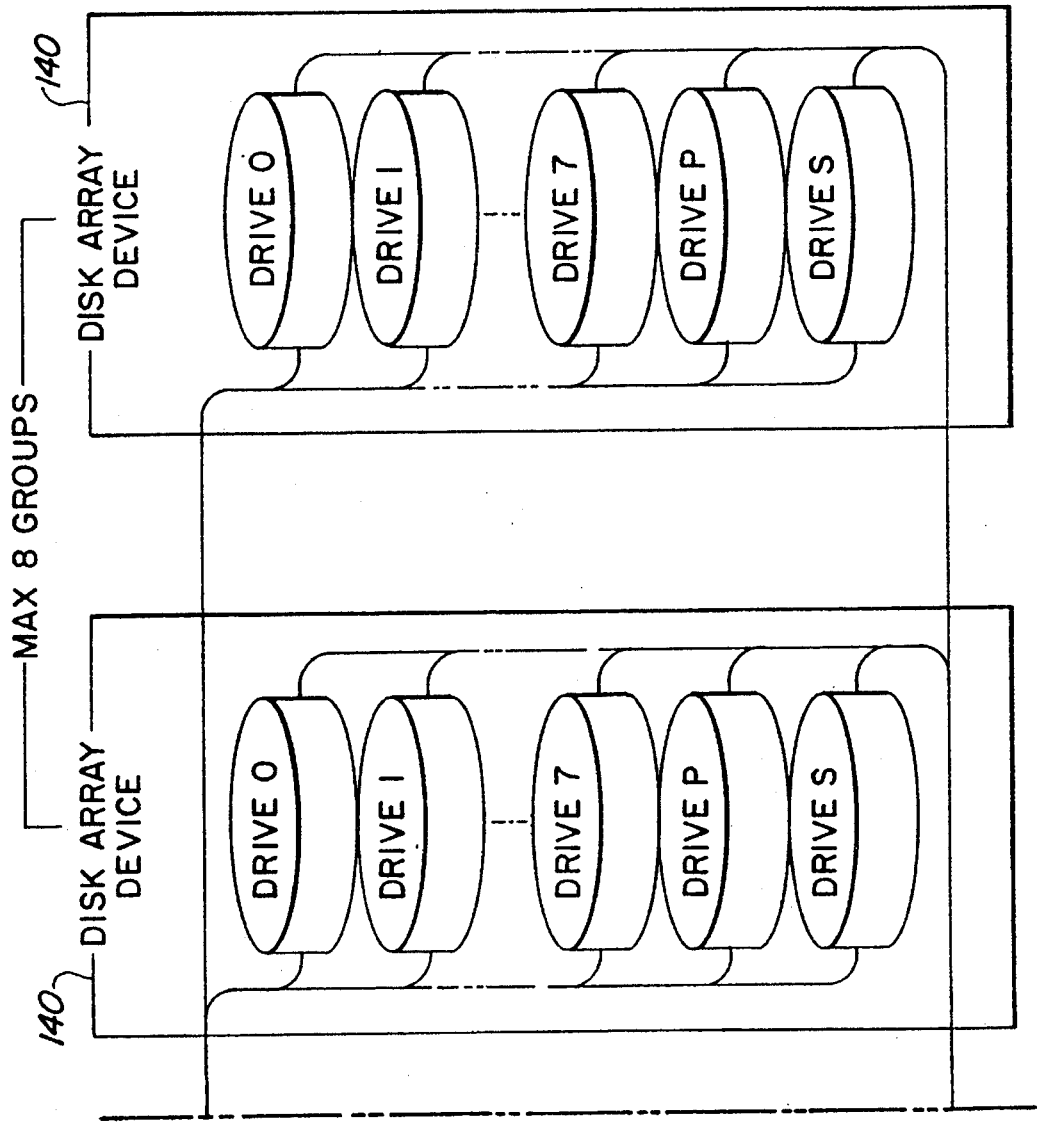

Finally, block diagrams of a disk array control unit 120 and a plurality of disk array devices 140 controlled by the disk array control unit 120 are illustrated in FIGS. 9(A) and 9(B), respectively. In this case, eight disk drives at maximum can be controlled by the disk array control unit 120 having a plurality of directors.

In FIG. 9(A), high-speed optical channels A, B, C and D, and a high-speed optical control module functioning as an optical/electric interface (O/E interface), are provided to enable date to be transferred at high speed between the channel and the disk array devices 140'. The disk array control unit 120 consists of two directors. Each director consists of two modules: the optical control module as described above; and an array control module to control the disk array devices 140'.

The latter module is divided into ten device controllers to control the respectively corresponding disk drives (Drive 0–7, Drive P and Drive S as shown in FIG. 16(B)) and an array date controller to transfer the data to or from each of the device controllers.

The two directors in the disk array control unit are independent of each other. These directors can control two groups of disk array devices simultaneously.

In this case, the operation panel 226 (FIG. 8) can display the status information of each of two disk array devices.

I claim:

1. An apparatus for data checking in a storage system which includes a plurality of storage devices, and which operates the respective storage devices in parallel, the apparatus receiving write data as data blocks each including a data of an error detecting code generated in a host device, said apparatus comprising:

means for transferring write data to said respective storage devices in a write operation or transferring read data therefrom in a read operation;

means for checking data in the storage system, said data checking means being operative to execute both a write data checking process when the write data are transferred to said respective storage devices in said write operation, and a read data checking process that will be executed in said read operation;

first data transfer paths for transferring said write data;

second data transfer paths for transferring said read data, and wherein said data checking means is operative to execute the write data checking process by utilizing said second data transfer paths, which are out of use during said write operation, as well as said first data transfer paths;

means for checking and storing the data of error detecting codes from said host device;

means for dividing said data blocks so as to be written in said plurality of storage devices simultaneously;

means for combining said data transferred to said second data transfer paths into data which are to be transferred to said host device;

means for generating data of an error detecting code again for said host device for each of said combined data; and means for comparing each of the data of error detecting codes generated again for said host device, with each of the data of error detecting codes stored previously, so as to check whether or not said two kinds of data correspond to each other and to check whether or not said write data have been correctly written in said respective storage devices.

2. An apparatus for data checking as set forth in claim 1, said apparatus comprises:

means for generating data of an error detecting code for each of said storage devices for each of said divided data blocks, so that said divided data blocks, to which the respectively corresponding generated data of the error detecting codes are added, can be written in said respective storage devices and can be simultaneously transferred to said second data transfer paths.

3. An apparatus for data checking as set forth in claim 2, wherein said means for storing said data of said error detecting codes includes a register unit for a cyclic redundancy check of said host device, and wherein said means for comparing said two kinds of data with each other includes a comparator.

4. An apparatus for data checking as set forth in claim 1, wherein said storage system is a disk array system.

5. An apparatus for data checking in a storage system which includes a plurality of storage devices, and which operates the respective storage devices in parallel, and which transfers write data to said respective storage devices in a write operation or transfers read data therefrom in a read operation, wherein said apparatus receives said read data as data blocks each including a data of an error detecting codes read from said respective storage devices, said apparatus comprising;

first data transfer paths for transferring said write data;

second data transfer paths for transferring said read data, wherein said apparatus is operative to execute the read data check processing by utilizing said first data transfer paths, which are out of use during said read operation, as well as said second data transfer paths;

means for checking and storing the data of error detecting codes for said respective storage devices;

means for combining said data blocks into data which are to be transferred to a host device;

means for generating data of an error detecting code for said host device for each of said combined data blocks, so that said combined data blocks, to which the respectively corresponding generated data of the error detecting codes are added, can be transferred to said host device, and simultaneously transferred to said first data transfer paths;

means for generating data of an error detecting code again for each of said storage devices for each of said divided data; and means for comparing each of the data of error detecting codes generated again for each of said storage devices, with each of the data of error detecting code stored previously, so as to check whether or not said two kinds of data correspond to each other and to check whether or not said read data have been correctly read from said respective storage devices.

6. An apparatus for data checking as set forth in claim 5, wherein said means for storing said data of said error detecting codes includes a register unit for a cyclic redundancy check of said storage devices, and wherein said means for comparing said two kinds of data with each other includes a comparator.

7. An apparatus for data checking as set forth in claim 5, wherein said storage system is a disk array system.

8. A method for data checking in a storage system which includes a plurality of storage devices, and which operates the respective storage devices in parallel, the method receiving write data as data blocks each including a data of an error detecting code generated in a host device, the method comprising the steps of;

transferring write data to said respective storage devices in a write operation or transferring read data therefrom in a read operation;

executing a write data checking process when the write data are transferred to the respective storage devices in the write operation, and executing the same data checking process in a read operation;

executing the write data checking process by utilizing second data transfer paths for transferring said read data, which are out of use during said write operation, as well as first data transfer paths for transferring said write data;

checking the data of error detecting codes for said host device and storing said data in a register unit provided inside said storage system;

dividing said data blocks so as to be written in said plurality of storage devices simultaneously;

combining said data transferred to said second data transfer paths into data which are to be transferred to said host device;

generating data of an error detecting code again for said host device for each of said combined data; and comparing each of the data of error detecting codes generated again for said host device, with each of the data of error detecting codes stored in said register unit, so as to check whether or not said two kinds of data correspond to each other and to check whether or not said write data have been correctly written in said respective storage devices.

9. A method for data checking as set forth in claim 8, wherein said method comprises:

generating data of an error detecting code for each of said storage devices for each of said divided data blocks, so that said divided data blocks, to which the respectively corresponding generated data of the error detecting codes are added, can be written in said respective storage devices and simultaneously transferred to said second data transfer paths.

10. A method for data checking as set forth in claim 8, wherein said storage system is a disk array system.

11. A method for data checking in a storage system which includes a plurality of storage devices, and which operates the respective storage devices in parallel, said method comprising the steps of:

transferring write data to said respective storage devices in a write operation or transferring read data therefrom in a read operation, wherein said method receives said read data as data blocks each including a data of an error detecting codes lead from said respective storage devices;

executing the read data checking process by utilizing first data transfer paths for transferring said write data, which are out of use during said read operation, as well as second data transfer paths for transferring said read data;

checking the data of error detecting codes for said respective storage devices, and storing said data in a register unit provided inside said storage system;

combining said data blocks into data which are to be transferred to a host device;

generating data of an error detecting code for said host device for each of said combined data blocks, so that said combined data blocks, to which the respectively corresponding generated data of the error detecting codes are added, can be transferred to said host device, and simultaneously transferred to said first data transfer paths;

generating data of an error detecting code again for each of said storage devices for each of said divided data: and comparing each of the data of error detecting codes generated again for said each of storage devices, with each of the data of error detecting codes stored in said register unit, so as to check whether or not said two kinds of data correspond to each other and to check whether or not said read data have been correctly read from said respective storage devices.

12. A method for data checking as set forth in claim 11, wherein said storage system is a disk array system.

* * * * *

UNITED STATES PATENT AND TRADEMARK OFFICE
CERTIFICATE OF CORRECTION

PATENT NO. : 5,477,552
DATED : December 19, 1995
INVENTOR(S) : Nishiyama

It is certified that error appears in the above-indentified patent and that said Letters Patent is hereby corrected as shown below:

Column 4, line 20, delete "As" and insert --At--.

Column 11, line 10, delete "date" and insert --data--.

Column 14, line 8, delete "lead" and insert --read--.

Signed and Sealed this

Third Day of June, 1997

Attest:

BRUCE LEHMAN

Attesting Officer

Commissioner of Patents and Trademarks